(12) United States Patent
Callan et al.

(10) Patent No.: US 7,353,197 B2
(45) Date of Patent: Apr. 1, 2008

(54) TRANSACTION CONTROL SYSTEM

(75) Inventors: James Callan, Dublin (IE); Colin Piper, Dublin (IE)

(73) Assignee: Siebel Systems EMEA Ltd., Dublin (IE)

( * ) Notice: Subject to any disclaimer, the term of this patent is extended or adjusted under 35 U.S.C. 154(b) by 1260 days.

(21) Appl. No.: 10/242,694

(22) Filed: Sep. 13, 2002

(65) Prior Publication Data

US 2003/0018555 A1    Jan. 23, 2003

Related U.S. Application Data

(63) Continuation of application No. PCT/IE00/00029, filed on Mar. 14, 2000.

(51) Int. Cl.
*G06Q 40/00* (2006.01)
(52) U.S. Cl. ...................................................... 705/35
(58) Field of Classification Search ............. 705/35–45
See application file for complete search history.

(56) References Cited

U.S. PATENT DOCUMENTS 5,765,144 A    6/1998  Larche et al. ................. 705/38
5,933,816 A    8/1999  Zeanah et al. ................. 705/35
2007/0038557 A1*  2/2007  Kemp et al. ................... 705/37

OTHER PUBLICATIONS

CIBC: Canadian Imperial Bank of Commerce (CIBC) selects Eontec for branch network renewal; CIBC banks on Eontec's Enterprise Java-based multi-channel banking solution as part of its retail bank renewal strategy M2 Presswire. Coventry: Nov. 29, 2001.*
Steve Vinoski, IEEE Comm. Mag., Feb. 1997, pp. 46-55, CORBA: Integrating Diverse Applications Within Distributed . . . .

* cited by examiner

*Primary Examiner*—R Weisberger
(74) *Attorney, Agent, or Firm*—Townsend and Townsend and Crew LLP (57) ABSTRACT

A transaction control system (1) generates presentation objects (19-22) which reside on front-end terminals. The control system (1) also comprises a business rules layer (16), a transaction layer (17), and an external interface layer (18). A transaction processing module (M1-M4) is created by a control system generating a presentation object and transferring it to a relevant front-end terminal and also instantiating a business object (23-25), a transaction object (27-29), and an external interface object (30-32). Development of transaction processing modules is therefore very simple and the module is versatile and may be easily modified.

8 Claims, 4 Drawing Sheets

| Payment Details for Amend | | | |
|---|---|---|---|
| Sort Code | 601212 | Account Number | 69000512 |
| Destination Sort Code | 204506 | DestinationAccount Number | 66582003 |
| Reference Mumber | | Payment Control Number | 1000036 |
| Beneficiary Name | Richard Lance x 4 nights | Payment Status | Unsigned |
| Currency | IEP | Amount | 2103.41 |
| | | Date | 06/10/1999 |
| Narrative | Camden Court Hotel | | |

Fig. 4

TRANSACTION CONTROL SYSTEM

This is a continuation of PCT/IE00/00029 filed Mar. 14, 2000 and published in English.

INTRODUCTION

1. Field of the Invention

The invention relates to a transaction processing system and to a method for generating such a system.

2. Prior Art Discussion

The invention relates in particular to transaction processing in environments in which there are very high volumes of transactions, such as for financial institutions. In such environments, there have traditionally been large mainframe back office systems which are generally very efficient at processing fixed length data fields and messages for transaction processing. Typically, these mainframe systems are connected to terminals in financial institution branches or other offices.

However, in recent years there has been an increasing requirement for ever more powerful front-end processing because there is a need to provide a large range of financial products is a versatile manner. These products include insurance services, life assurance services, and a wide range of different types of loan products and credit card processing services.

One solution to this problem is to provide a powerful distributed system in which processors and workstations are interconnected in a high-speed network However, this is often not feasible because complete transfer over from the original host system is not practical, and in any event the highly efficient nature of the processing which is carried out by the host system is still required.

3. Objects of the Invention

It is an object of the invention to provide a transaction control system to provide the front-end processing capacity required in such transaction processing environments, without sacrificing back-office processing efficiency.

Another object is to provide a method for developing transaction processing modules in a quick and versatile manner.

SUMMARY OF THE INVENTION

According to the invention, there is provided a transaction control system comprising:

a presentation layer comprising means for generating presentation objects and for transferring the objects to a front end terminal, the presentation objects having code to direct capture of data, transfer of data to the control system, and output of data at the terminal;

a business rules layer comprising business objects each comprising data and code implementing business rules, each business object being associated with a business transaction service comprising a plurality of transaction types;

a transaction layer comprising transaction objects, each comprising means for performing bi-directional transfer of data and being associated with a transaction type, and an external interface layer comprising external interface objects, each of which is configured for communication with a transaction processing host In one embodiment, the presentation objects each comprise:—
 a communication manager for communication with business objects over a network interconnecting the control system and the front-end terminals;
 a plurality of panel controllers comprising means for handling and interpreting panel interaction events; and
 a plurality of panels controlled by the panel controllers for receiving and displaying transaction data.

Preferably, each presentation object comprises a dedicated panel controller associated with each panel.

In another embodiment, each presentation object further comprises at least one co-ordmator, the coordinator comprising means for co-ordinating display of a sequence of panels for a transaction type.

In a further embodiment, there is a one-to-many relationship between business objects and presentation object co-ordinators.

Preferably, there is a one-to-one relationship between transaction objects and presentation object co-ordmators, each being associated with a transaction type.

In another embodiment, each presentation object comprises means for utilizing at least one model for defining data transfer between a co-ordinator and a business object.

In a further embodiment, the model comprises data and a mapping structure.

In the latter embodiment each model is an instance of a class instantiated by an associated business object on-the-fly.

According to another aspect, the invention provides a method for generating a transaction processing module operating with a front-end terminal and a host transaction processor, the method comprising the steps of:—
 providing a transaction control system comprising means for communicating with the front-end terminal and the host,
 the control system generating a presentation object having code to direct capture of data, transfer of data to the control system, and output of data at the terminal;
 the control system transmitting the presentation object to the front-end terminal;
 interactively selecting in the control system a business object comprising data and code implementing business rules, the business object being associated with a business transaction service comprising a plurality of transaction types;
 interactively selecting in the control system a transaction object comprising means for performing bi-directional transfer of data and being associated with a transaction type;
 interactively selecting an external interface object configured for directing communication with the host; and
 linking the presentation, business, transaction, and external interface objects to provide a module.

Preferably, the presentation object comprises a plurality of panels, panel controllers for controlling display sequencing of the panels, and a coordinator for co-ordinating display of a sequence of panels for a transaction type.

In another embodiment, there is a single presentation object co-ordmator associated with each transaction object.

DETAILED DESCRIPTION OF THE INVENTION

Brief Descriptions of the drawings

The invention will be more clearly understood from the following description of some embodiments thereof, given by way of example only with reference to the accompanying drawings in which:—

DESCRIPTION OF THE EMBODIMENTS

Figure 1:
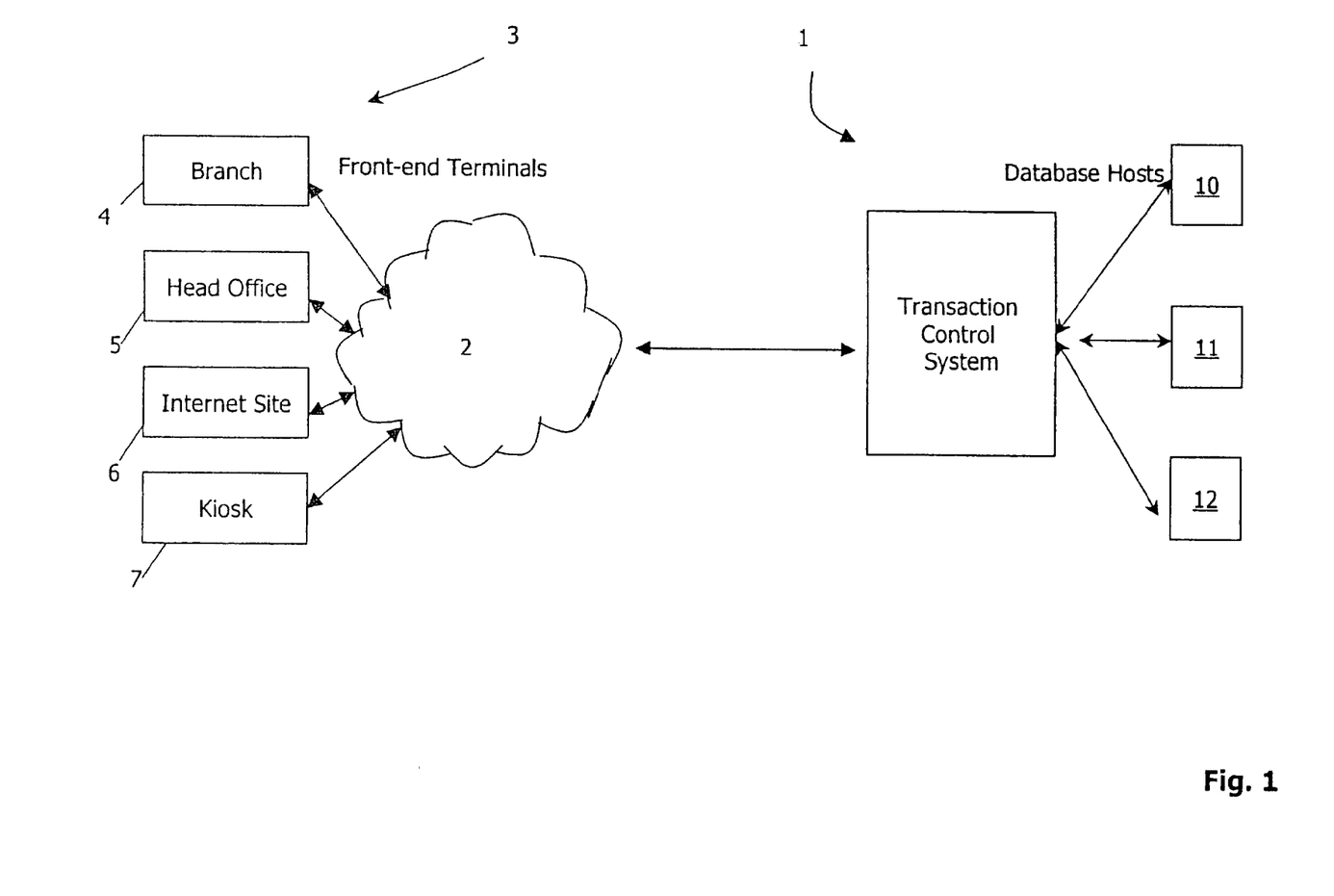
FIG. 1 is a diagrammatic representation of a network of data processing equipment illustrating the context of a transaction control system of the invention.

Referring to the drawings, and initially to FIG. 1 there is shown a transaction control system 1. The system 1 communicates by a network 2 with a number of front-end terminals 3. In this embodiment, the control system 1 is for use in a financial institution and the front-end terminals include a branch terminal 4, a head office terminal 5, an Internet site, 6, and a kiosk 7. The terminals 3 include processors and are capable of performing transaction processing at a capacity similar to that of a PC. The control system 1 is also connected to back-office database host systems 10, 11 and 12. These systems are of the traditional type and are typically mainframe systems which are particularly efficient at processing fixed length data fields for high volume transaction processing.

In the past, hosts such as the hosts 10, 11, and 12 have been connected to slave terminals for user interaction. The problem with this scenario is that there is very little flexibility in the manner in which business services can be provided to customers by organisations such as financial institutions. Therefore, the invention provides the transaction control system 1 with a view to providing flexibility which is required in the current business environment while at the same time maintaining the advantages of highly efficient processing provided by the database hosts 10, 11, and 12.

Figure 2:
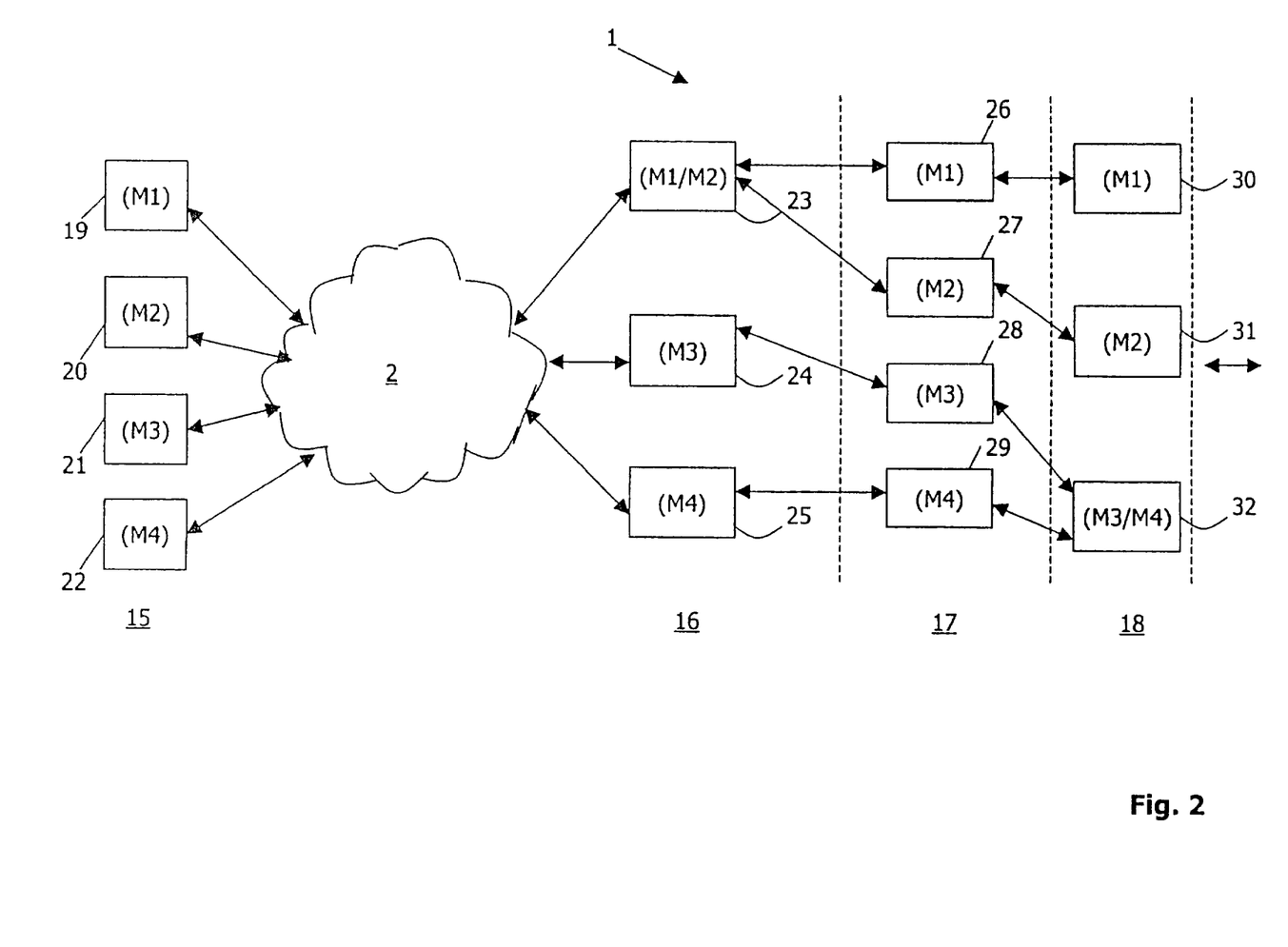
FIG. 2 is a diagrammatic representation showing operation of the control system.

Referring now to FIG. 2, the logical architecture for transaction processing is illustrated. This architecture comprises a number of modules indicated as M1, M2, M3 and M4 The underlying hardware is the set of database hosts, the control system 1, and the front-end terminals (which are typically PCs) The control system 1 is an enterprise class server, but may alternatively be a mainframe system.

The control system 1 comprises four layers of objects. As shown in FIG. 2, there is a presentation layer 15 of objects 19, 20, 21, and 22. These objects are generated by the control system 1 and are transmitted via the network 2 to the relevant front-end terminals 3. The architecture also comprises objects in three layers residing on the control system hardware. These are a business rules layer 16, a transaction layer 17, and an external interface layer 18. The business rules layer 16 comprises business objects 23, 24, and 25. The transaction layer 17 comprises transaction objects 26, 27, 28, and 29. The external interface layer 18 comprises external interface object 30, 31, and 32.

Briefly, to generate a transaction processing module for a particular business service, an object is selected from each of the four layers and communication threads are established between them to form the module. In the example shown in FIG. 2, a module M1 comprises a presentation object 19, a business object 23, a transaction object 26, an external interface object 30. A second module, M2, comprises a presentation object 20, the business object 23 (which is also part of the module M1), a transaction object 27, and an external interface object 31. Configuration of the modules M3 and M4 are likewise illustrated in FIG. 2 with the module names in parentheses.

Figure 3:
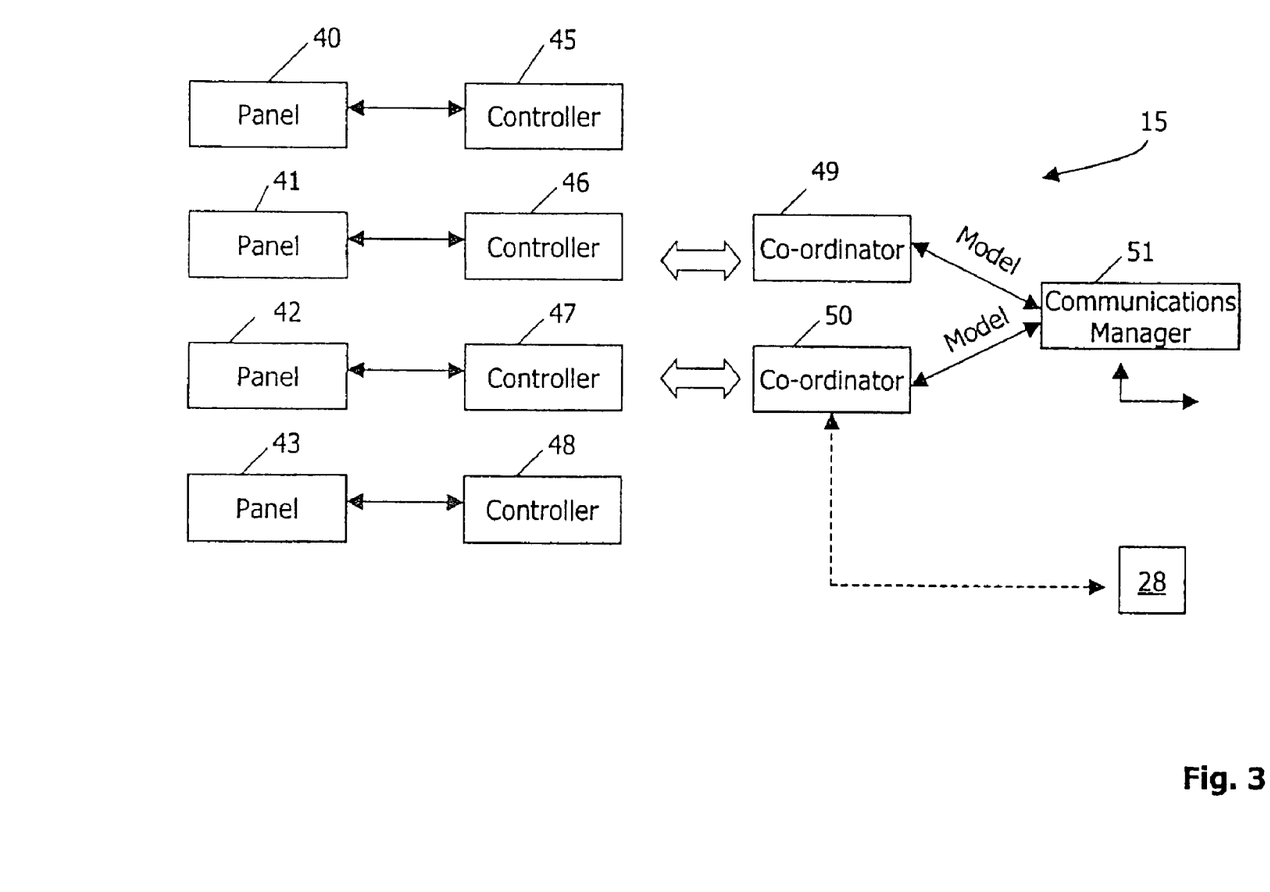
FIG. 3 is a more detailed diagram showing operation of a front-end terminal connected to the control system.

Referring now to FIG. 3, the configuration of a presentation object is described in more detail. Each presentation object 19, 20, 21, and 22 comprises a set of panels and in the example illustrated there are four panels 40, 41, 42, and 43. Each panel has a dedicated controller, and the four controllers are indicated by the numerals 45, 46, 47 and 48. Each presentation object comprises at least one co-ordinator and in the example shown there are two coordinators 49 and 50. Also, each presentation object comprises a communications manager 51.

Generally, each presentation object comprises code to direct capture of data, transfer of data to the business rules layer, and output of data at the relevant front-end terminal 3 The panels provide GUI screens with radio buttons, drop-down menus, and other user interactive displays. They are developed using a Java-based development tool. Each panel controller comprise code for handling and interpreting interfacing events at the associated panel.

Each co-ordinator controls the sequence of panels for a particular transaction type and is associated with that transaction type, such as processing a loan application. There is a one-to-one relationship between each co-ordinators and a transaction object in the transaction layer 17. For example, in the diagram of FIG. 3 the co-ordinator 50 is associated with the transaction object 28 as indicated by interrupted line. On the other hand, each business object relates to a range of transaction types to form a complete business service for an individual transaction processing module M1 to M4.

The communications manager 51 provides middleware communication protocol control, such as Http, Https, IIOP, and RMI.

Communication between each coordinator 49 and 50 and the communications manager 51 is set according to a model which is generated on-the-fly by the relevant business object for the module. The model includes data and a mapping structure for transfer of information bi-directionally. Each model is therefore associated with a particular transaction type.

Regarding the business objects, these are templates which are instantiated and comprise data and behaviour code which implement rules for a particular business service. The behaviour code sets the delivery channels and creates the presentation object and the models for data transfer As stated above, each business object also generates the model on-the-fly in real time for transaction processing. For instance, the presentation object may submit an update to the business object. The presentation object (perhaps running on an Internet Browser) transfers the data model to the business object, which examines and validates the contents of the data before generating the fixed-length data transaction and transmitting the transaction to the associated host via the layers 17 and 18.

An important aspect of the business objects is that they comprise a large degree of pre-defined template code and are instantiated for a particular service. For example, the control system may initially comprise a set of business object templates relating to services such as head office administration processing or kiosk processing. To generate a particular module for a business service, the business object is instantiated and any necessary additional code is added. This object is then capable of generating the required presentation object for the module and it interfaces as defined during the generating stage with a particular transaction object, which in turn interfaces with a particular external interface object.

Each transaction object comprises Java™ components for data transfer and on the back office side communicates with fixed-length data fields. As stated above, there is a one-to-one relationship between each transaction object and a coordinator in a presentation object as each relates to a particular transaction type. Of course, if a different presentation object also handles the same transaction type, it also will have a coordinator associated with the same transaction object.

The external interface objects 30, 31, and 32 provide services similar to those provided by the communications manager 51 of the presentation object. They allow communication according to the desired protocol for the associated host such as the IBM CICS™ MQ Serles™ protocols. The external interface objects also provide integration with groupware and desk top applications and interface with separate existing systems.

To illustrate the functions performed by the various objects, the following is an example of a generic process sequence for an enquiry update transaction type.

The user selects/enters the account and payment in the GUI.

The panel co-ordinator 49 generates the data model required to return the payment details and sends it to the business object. This includes the key identifying elements, account number, and payment control number.

The business object retrieves the payment information, builds the data model, and returns it to the panel co-ordinator 49 client.

Figure 4:
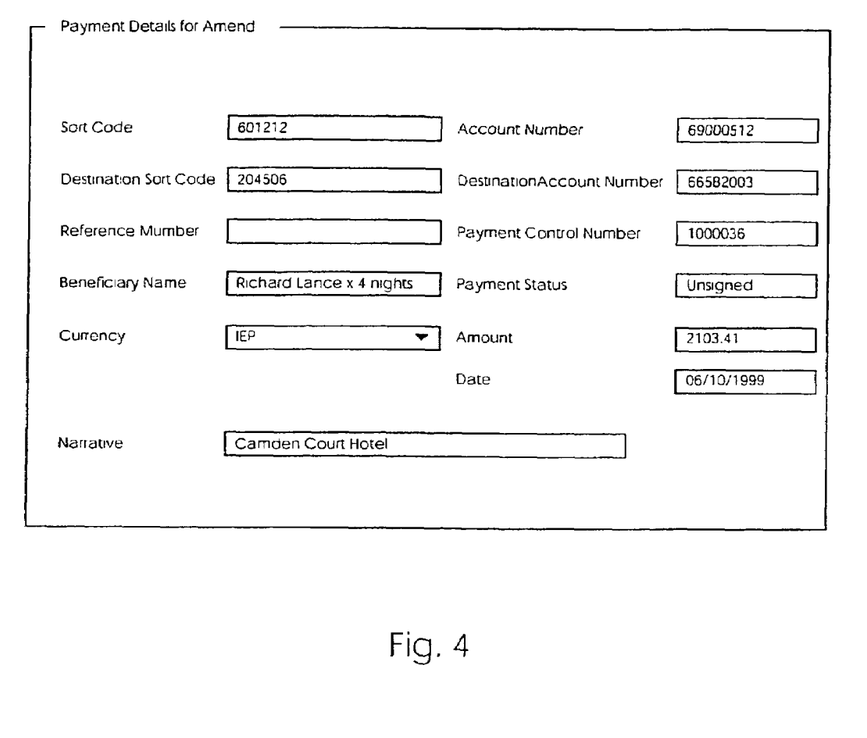
FIG. 4 is a sample of a screen of the system

The panel co-ordinator 49 displays the current information on the screen (as shown in FIG. 4) and enables the user to update it. The user can modify the appropriate elements of the payment, and the panel co-ordinator transmits the modified information to the business object for update.

The business object examines the modified information, confirms that it is valid, generates the update transaction and transmits it to the host system via the layers 17 and 18.

The business object examines the response from the host, and returns an appropriate message to the panel coordinator 49.

The business object writes the audit trail.

This sequence of events is a particular transaction type and has a dedicated co-ordinator 49 in a presentation object and a dedicated transaction object. The code for this generic sequence of events is set by templates for generating the relevant objects and so relatively little coding is required for particular modules. Using this type of information, an object in the business rules layer 16 is selected and subsequently one or more objects in each of the others layer is also selected.

The following is an example of a module for handling interest rate updates on a host system.

| Layer | Objects |
| --- | --- |
| Presentation | InterestRateView |
| Business Rules | InterestRate |
| Transaction | InterestRateEnquiryTxn |
| | InterestRateUpdateTxn |
| External Interface | ConnectorCICS |
| | Connector DB2 |

In another example, the following is the sequence. Firstly, the user enters information into the client panel and clicks the "OK" button to submit a request. The front-end framework formats this data as a collection of key-pairs, possibly in XML format, and transmits this collection of data to an application server, using an appropriate protocol (Http, Https, RMI, IIOP are common protocols). The client request is sent to a Servlet on a Web server. This Servlet interprets the data, which carries a request ID. The Servlet carries out a look-up to find the business object that provides the required functionality, namely a banking service object. It then generates a request to this banking service object on an EJB Container. This object carries out the business process, and generates requests to the business objects that it needs.

In turn, the business objects identify the data requirements (retrievals and updates) and generate the appropriate requests to the external interface objects The EJB objects are independent of the communication protocol, and of the distributed naming service. A typical module uses the IIOP communication protocol and the JNDI naming service.

The external interface objects communicate with the host system across the available middleware channel (possibly MQ Series™, CICS™ or Tuxedo™) using the request formats that are available on the host system. The external interface objects may also retrieve data from mid-tier databases, typically using JDBC connections.

It will be appreciated that the invention provides a method for developing a transaction processing module in a very fast and effective manner. All that is required is that one or more objects in each layer is instantiated and completed with code for the particular requirements. It will also be appreciated that the control system operates in a versatile manner to allow simple modification of its structure according to changing business requirements.

The invention is not limited to the embodiments described but may be varied in construction and detail within the scope of the claims.

The invention claimed is:

1. A system for providing business services to a plurality of client processing devices, the transaction control system comprising:

at least one database host system operable to process and store transactional data; and a transaction control system in communication with the plurality of client processing devices and the at least one database host system, the transaction control system including a processor and processor-executable instructions embedded in a computer readable medium that, when executed by the processor, cause the transaction control system to:

analyze a request received from one of the client processing devices, the request corresponding to a transaction for one of the business services;

generate a presentation object and transfer the presentation object to the client processing device having sent the request, the presentation object including code that, when executed by a processor of the client processing device, causes the client processing device to direct capture of transactional data and transfer the transactional data to the transaction control system, the presentation object including a plurality of user interface panels each with a dedicated controller and at least one communication management function for directing capture of data from a user of the client processing device and interpreting interfacing events for each panel;

instantiate a template for the corresponding business service to generate a business object in the transaction control system, the business object including code that, when executed by a processor of the transaction control system, causes the transaction control system to implement business rules for processing the transaction and apply the business rules to process the transaction, the corresponding business service being associated with a plurality of transaction types;

generate a transaction object in the transaction control system, the transaction object including code that, when executed by the processor of the transaction control system, causes the transaction control system to perform bi-directional transfer of transactional data associated with a transaction type; and generate an external interface object in the transaction control system, the external interface object including code that, when executed by the processor of the transaction control system, causes the transaction control system to be able to communicate the transactional data with one of the at least one database host system, wherein the presentation object on the client processing device and the business object, transaction object, and external interface object on the transaction control system form a module for the corresponding business service enabling a transaction for the business service between the client processing device and the at least one database host system.

2. A system as claimed in claim 1, wherein the communication management function of the presentation object on the client processing device enables communication with the business object over a network interconnecting the transaction control system and the client processing device.

3. A system as claimed in claim 1, wherein the presentation object further comprises at least one coordinator, the coordinator comprising means for coordinating display of a sequence of panels for a transaction type.

4. A system as claimed in claim 3, wherein there is one-to-many relationship between business objects and presentation object coordinators.

5. A system as claimed in claim 3, wherein there is a one-to-one relationship between transaction objects and presentation object coordinators, each being associated with a transaction type.

6. A system as claimed in claim 3, wherein the presentation object comprises means for utilizing at least one data transfer mechanism for defining data transfer between a coordinator and the business object.

7. A system as claimed in claim 6, wherein the data transfer mechanism comprises data and a mapping structure.

8. A system as claimed in claim 7, wherein each data transfer mechanism is an instance of a class instantiated by an associated business object on-the-fly.

* * * * *

UNITED STATES PATENT AND TRADEMARK OFFICE
CERTIFICATE OF CORRECTION

PATENT NO. : 7,353,197 B2  Page 1 of 2
APPLICATION NO. : 10/242694
DATED : April 1, 2008
INVENTOR(S) : Callan et al.

It is certified that error appears in the above-identified patent and that said Letters Patent is hereby corrected as shown below:

On sheet 4 of 4, in Figure 4, line 4, delete "Mumber" and insert -- Number --, therefor.

In column 1, line 31, after "network" insert -- . --.

In column 1, line 67, after "host" insert -- . --.

In column 2, line 13, delete "co-ordmator," and insert -- co-ordinator, --, therefor.

In column 2, line 13, delete "coordinator" and insert -- co-ordinator --, therefor.

In column 2, line 20, delete "co-ordmators," and insert -- co-ordinators, --, therefor.

In column 2, line 34, delete "host," and insert -- host; --, therefor.

In column 2, line 58, delete "co-ordmator" and insert -- co-ordinator --, therefor.

In column 2, line 62, delete "Descriptions" and insert -- Description --, therefor.

In column 2, line 62, delete "drawings" and insert -- Drawings --, therefor.

In column 3, line 5, delete "system," and insert -- system; --, therefor.

In column 3, line 8, after "system" insert -- . --.

In column 3, line 40, after "M4" insert -- . --.

In column 4, line 33, delete "coordinator" and insert -- co-ordinator --, therefor.

In column 4, line 44, after "transfer" insert -- . --.

In column 5, line 3, delete "coordinator" and insert -- co-ordinator --, therefor.

In column 5, line 6, delete "coordinator" and insert -- co-ordinator --, therefor.

In column 5, line 12, delete "MQ Serles™" and insert -- or MQ Series™ --, therefor.

UNITED STATES PATENT AND TRADEMARK OFFICE
CERTIFICATE OF CORRECTION

PATENT NO. : 7,353,197 B2
APPLICATION NO. : 10/242694
DATED : April 1, 2008
INVENTOR(S) : Callan et al.

It is certified that error appears in the above-identified patent and that said Letters Patent is hereby corrected as shown below:

In column 5, line 39–40, delete "coordinator" and insert -- co-ordinator --, therefor.

In column 6, line 14, after "objects" insert -- . --.

Signed and Sealed this

Tenth Day of November, 2009

David J. Kappos
*Director of the United States Patent and Trademark Office*